United States Patent Office

2,976,272
Patented Mar. 21, 1961

2,976,272

OLEFIN POLYMERIZATION USING A TRANSITION METAL HALIDE AND A REDUCED AROMATIC HYDROCARBON AS CATALYST

Harry W. Coover, Jr., and Willis C. Wooten, Jr., Kingsport, Tenn., assignors to Eastman Kodak Company, Rochester, N.Y., a corporation of New Jersey No Drawing. Filed Feb. 17, 1959, Ser. No. 793,691

13 Claims. (Cl. 260—94.9)

This invention relates to a new and improved polymerization process and is particularly concerned with the use of a novel catalyst combination for preparing high molecular weight solid polyolefins, such as polyethylene and polypropylene, of high density and crystallinity. In a particular aspect the invention is concerned with the preparation of polyethylene, polypropylene and higher polyolefins having a high crystallinity and a high density using a particular catalyst combination which has unexpected catalytic activity.

Polyethylene has heretofore been prepared by high pressure processes to give relatively flexible polymers having a rather high degree of chain branching and a density considerably lower than the theoretical density. Thus pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst conmbination often lead to liquid polymers rather than the desired solid polymers.

Certain metals, metal hydrides, and metal alkyls have been used in conjunction with inorganic halides to produce high molecular weight polyethylene. Thus, certain metal alkyls when used in conjunction with titanium tetrachloride permit a low temperature, low pressure polymerization of ethylene to highly crystalline product. When these catalysts are employed to polymerize propylene and higher α-monoolefins, the results obtained are quite different. Furthermore, completely organic co-catalysts have not been used heretofore in combination with transition metal halides to produce catalysts mixtures that are effective for the production of crystalline poly-α-olefins.

This invention is concerned with and has for an object the provisions of improved processes whereby α-monoolefins and particularly ethylene and propylene can be readily polymerized by catalytic means to give high molecular weight, highly crystalline polymers. A particular object of the invention is to provide a novel catalyst combination which has unexpected catalytic activity for the polymerization of ethylene, propylene and higher α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a halide of a transition metal selected from the group consisting of titanium, vanadium, chromium, molybdenum and zirconium and a partially reduced unsaturated aromatic hydrocarbon. The metal halides can be at their maximum valency or at a reduced valency, and the halides are selected from the group consisting of chlorides, bromides, and iodides. Among the halides that can be used are titanium tetrachloride, titanium trichloride, titanium tetrabromide, titanium tribromide, titanium tetraiodide, titanium triiodide, vanadium tri- and tetrachloride, vanadium tri- and tetrabromide, vanadium tri- and tetraiodide, and similar halides of zirconium, chromium, and molybdenum.

The partially reduced aromatic hydrocarbons used in the catalyst mixture can have a condensed multi-ring structure or a single ring structure. The hydrocarbons are not completely reduced and they contain at least one unsaturated bond. Among the partially reduced hydrocarbons that can be used are 1,2-dihydrobenzene, 1,4-dihydrobenzene, 1,2-dihydronaphthalene, 1,4-dihydronaphthalene, 9,10-dihydroanthracene, 1-methyl-1,3-cyclohexadiene, 1-methyl-1,4-cyclohexadiene, and the like. These co-catalysts are completely organic, and in this respect they differ quite distinctly from the co-catalysts employed heretofore.

The catalystic activity of the catalyst of this invention was wholly unexpected, particularly since the components of the catalyst are not known to be polymerization catalysts when used alone. The inventive process is carried out in liquid phase in an inert organic liquid and preferably an inert liquid hydrocarbon vehicle, but the process can be carried out in the absence of a diluent. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, as well as styrene, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weight even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

Polypropylene prepared according to this invention has a softening point above 155° C. and a density of 0.91 and higher. Usually the density of the polypropylene is of the order of 0.91 and 0.92.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other $\alpha$-olefins have similarly improved properties. The process of the invention can also be employed to effect the copolymerization of ethylene with other polymerizable $\alpha$-monoolefins and particularly with propylene. Other monoolefins which are suitably employed either alone or in admixture include such materials as n-butylene, isobutylene, 1-pentene, 1-decene, styrene, and similar $\alpha$-monoolefins. In some cases, it is desirable to prepare copolymers of the $\alpha$-monoolefins in order to modify the properties for particular uses such as in molding or extrusion applications. Thus, copolymers of 5–95% ethylene with 95–5% propylene are desirably prepared in many cases.

The limiting factor in the temperature of the polymerization process appears to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zones at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 3% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution are ordinarily less desirable because the polymer dissolved in the reaction medium results in a very viscous solution.

The molar ratio of partially reduced aromatic hydrocarbon to metal halide is within the range of 0.25:1 to 4:1, but ratios outside the expressed range can be used, if desired.

The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well-known inert liquid hydrocarbons.

The polymerization is ordinarily accomplished by merely admixing the components of the polymerization mixture as previously described, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle froms a high percentage of the polymerization mixture and hence can be heated or cooled to maintain the temperature as desired.

Thus, by means of this invention polyolefins such as polyethylene, polypropylene, polystyrene, and the like are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

The following examples are illustrative of the practice of our invention.

Example 1

A mixture of 0.05 g. of titanium tetrachloride and 0.01 g. of 1,2-dihydrobenzene was placed in a dry 300-ml. autoclave which had been thoroughly purged with dry nitrogen. The autoclave was sealed and was purged with dry, pure ethylene and was pressured with ethylene to 1,000 p.s.i. The autoclave was then heated slowly over a 2-hour period to 130° C. When this temperature was reached, the ethylene was adjusted to 5,000 p.s.i. These conditions were maintained for a period of 20 hours. After the first six hours, a slow but steady decrease in pressure began to occur and the pressure was necessarily adjusted several times in order to maintain the 5,000 p.s.i. The product was removed from the autoclave by means of hot xylene and was precipitated from the xylene by the addition of dry methyl alcohol. The resulting powder was washed several times with hot, dry methanol and dried. The yield was 2.4 g. of polyethylene having a density of 0.961 and an inherent viscosity of 1.17 in tetralin at 145° C.

Desirable results can be obtained using 1,4-dihydrobenzene in place of the 1,2-dihydrobenzene, and by using vanadium tetrachloride in place of titanium tetrachloride.

Example 2

A mixture of 0.9 g. of titanium tetrabromide, 0.45 g. of 9,10-dihydroanthracene, and 40 ml. of dry heptane was placed in a dry 300-ml. autoclave which had been purged with dry nitrogen. The autoclave was sealed and was purged with dry, pure ethylene. It was then heated to 150° C. and the pressure was adjusted to 600 p.s.i. with ethylene. After maintaining these conditions for 20 hours, the autoclave was cooled to room temperature and bled to atmospheric pressure. The product was removed from the autoclave in the form of a globular-like mass. This was dissolved in hot xylene and was reprecipitated as a white powder by the addition of methyl alcohol to the xylene solution. The polyethylene had a density of 0.958 and an inherent viscosity of 1.44 in tetralin at 145° C.

Example 3

The procedure of Example 2 was followed except that the catalyst was a mixture of 1.54 g. of titanium trichloride and 0.33 g. of 1,4-dihydronaphthalene, and 40 g. of dry styrene monomer was used in place of the ethylene. The temperature used was 55–60° C. The autogenous pressure developed was about 30–40 p.s.i. The resulting polystyrene was shown by X-ray diffraction to be about 60% crystalline. Desirable results were obtained by replacing the titanium trichloride with vanadium trichloride.

Example 4

The procedure of Example 1 was followed except that the catalyst used was a mixture of 0.15 g. of titanium trichloride and 0.38 g. of 1,2-dihydrotoluene, and the ethylene was replaced by propylene. Thus, 100 ml. of propylene was admitted to the autoclave from a blowcase. The autoclave was heated to and maintained at 180° C. The initial autogenous pressure of about 800 p.s.i. slowly decreased over the 20-hour reaction period. The product was isolated and treated with hot methanol. After several washings with hot methanol, the polypropylene product was filtered and dried. The yield was 13.3 g. of polypropylene which had a density of 0.909, an inherent viscosity of 1.85 in tetralin at 145° C., and a softening point above 150° C. Desirable results were obtained using 1-methyl-1,3-cyclohexadiene and 1-methyl-1,4-cyclohexadiene in place of the 1,2-dihydrotoluene in separate runs.

Example 5

The procedure of Example 1 was followed using a catalyst mixture of 3.0 g. of titanium tetrachloride and 1.7 g. of 1,4-dimethyl-1,3-cyclohexadiene, and using 80 ml. of 4-methyl-1-pentene instead of ethylene at a temperature of 90° C. The product was solid crystalline poly-4-methyl-1-pentene was obtained. Desirable results were obtained using the other isomeric dihydroxylenes in place of the 1,4-dimethyl-1,3-cyclohexadiene.

Example 6

An autoclave was purged with dry nitrogen and was loaded with 1.9 g. of titanium tetrachloride, 3.6 g. of 9,10-dihydrophenanthrene, and 80 ml. of 3-methyl-1-butene. The autoclave was then closed and heated at 250° C. for 8 hours. The product was solid crystalline poly-3-methyl-1-butene having a softening point above 220° C. was obtained.

The inherent viscosities reported in the foregoing examples were determined in tetralin solution at 145° C. The percent crystallinity was determined by preparing a hot 2.5% (weight/volume) solution of the polymer, adding an equal volume of butanol, cooling, and recovering the precipitated polymer. The precipitate was washed with acetone and dried. The percent of the original polymer precipitated was taken as percent crystallinity.

Although the invention has been described in considerable detail with reference to certain preferred embodiments thereof, variations and modifications can be effected within the spirit and scope of the invention as described hereinabove and as defined in the appended claims.

We claim:

1. A catalyst for the polymerization of α-monoolefinic hydrocarbons consisting essentially of titanium tetrachloride and 1,2-dihydrobenzene in a molar ratio within the range of 1:0.25 to 1:4.

2. A catalyst for the polymerization of α-monoolefinic hydrocarbons consisting essentially of titanium tetrabromide and 9,10-dihydroanthracene in a molar ratio within the range of 1:0.25 to 1:4.

3. A catalyst for the polymerization of α-monoolefinic hydrocarbons consisting essentially of titanium trichloride and 1,4-dihydronaphthalene in a molar ratio within the range of 1:0.25 to 1:4.

4. A catalyst for the polymerization of α-monoolefinic hydrocarbons consisting essentially of titanium trichloride and 1,2-dihydrotoluene in a molar ratio within the range of 1:0.25 to 1:4.

5. A catalyst for the polymerization of α-monoolefinic hydrocarbons consisting essentially of titanium tetrachloride and 1,4-dimethyl-1,3-cyclohexadiene in a molar ratio within the range of 1:0.25 to 1:4.

6. In the polymerization of α-monoolefinic hydrocarbon material to form solid crystalline polymer, the improvement which comprises polymerizing the α-monoolefinic hydrocarbon material in the presence of a catalytic mixture consisting essentially of a halide of a transition metal selected from the group consisting of titanium and vanadium and a bis-dihydro unsaturated aromatic hydrocarbon, the molar ratio of halide to aromatic hydrocarbon being within the range of 1:0.25 to 1:4.

7. In the polymerization of an α-monoolefinic hydrocarbon selected from the group consisting of ethylene and propylene to form solid, crystalline polymer, the improvement which comprises polymerizing said α-monoolefinic hydrocarbon in the presence of a catalytic mixture consisting essentially of a halide selected from the group consisting of trihalides and tetrahalides of a metal selected from the group consisting of titanium and vanadium and a bis-dihydro unsaturated aromatic hydrocarbon, the molar ratio of halide to aromatic hydrocarbon being within the range of 1:0.25 to 1:4.

8. In the polymerization of ethylene to form solid, crystalline polymer, the improvement which comprises polymerizing the ethylene in the presence of a catalytic mixture consisting essentially of titanium tetrachloride and 1,2-dihydrobenzene in a molar ratio within the range of 1:0.25 to 1:4 at a temperature within the range of 0 to 250° C.

9. In the polymerization of ethylene to form solid, crystalline polymer, the improvement which comprises polymerizing the ethylene in the presence of a catalytic mixture consisting essentially of titanium tetrachloride and 9,10-dihydroanthracene in a molar ratio within the range of 1:0.25 to 1:4 at a temperature within the range of 0 to 250° C.

10. In the polymerization of ethylene to form solid, crystalline polymer, the improvement which comprises polymerizing the ethylene in the presence of a catalytic mixture consisting essentially of titanium tetrachloride and 1,4-dihydronaphthalene, in a molar ratio within the range of 1:0.25 to 1:4 at a temperature within the range of 0 to 250° C.

11. In the polymerization of ethylene to form solid, crystalline polymer, the improvement which comprises polymerizing the ethylene in the presence of a catalytic mixture consisting essentially of titanium tetrachloride and 1,2-dihydrotoluene in a molar ratio within the range of 1:0.25 to 1:4 at a temperature within the range of 0 to 250° C.

12. In the polymerization of ethylene to form solid, crystalline polymer, the improvement which comprises polymerizing the ethylene in the presence of a catalytic mixture consisting essentially of titanium tetrachloride and 1,4-dimethyl-1,3-cyclohexadiene in a molar ratio within the range of 1:0.25 to 1:4 at a temperature within the range of 0 to 250° C.

13. A catalyst for the polymerization of α-monoolefinic hydrocarbons consisting essentially of a halide of a transition metal selected from the group consisting of titanium and vanadium and a bis-dihydro unsaturated aromatic hydrocarbon, the molar ratio of halide to aromatic hydrocarbon being within the range of 1:0.25 to 1:4.

References Cited in the file of this patent

UNITED STATES PATENTS 2,879,263    Anderson et al. _____ Mar. 24, 1959

FOREIGN PATENTS 1,137,084    France _____ Jan. 7, 1957
777,538    Great Britain _____ June 26, 1957